United States Patent
Riesselmann et al.

(10) Patent No.: US 6,253,794 B1
(45) Date of Patent: Jul. 3, 2001

(54) CONDUIT IN PARTICULAR FOR SANITARY AND HEATING INSTALLATION PURPOSES

(75) Inventors: Franz-Josef Riesselmann, Lohne; Bernhard Dankbar, Ochtrup; Joerg Claussen, Havixbeck, all of (DE)

(73) Assignee: Hewing GmbH, Ochtrup (DE)

( * ) Notice: Subject to any disclaimer, the term of this patent is extended or adjusted under 35 U.S.C. 154(b) by 0 days.

(21) Appl. No.: 09/564,025

(22) Filed: May 4, 2000

(30) Foreign Application Priority Data

May 4, 1999 (DE) .......................................... 299 07 873 U

(51) Int. Cl.[7] ....................................................... F16L 9/00
(52) U.S. Cl. ........................ 138/177; 138/178; 138/121; 138/114; 138/108; 248/49
(58) Field of Search ..................................... 138/177, 121, 138/114, 103, 178, DIG. 11, 108; 248/49, 72, 58

(56) References Cited

U.S. PATENT DOCUMENTS

| | | | | |
|---|---|---|---|---|
| 4,245,924 | * | 1/1981 | Fouss et al. | 138/121 X |
| 5,275,506 | * | 1/1994 | Grimsley | 405/43 |
| 5,374,138 | * | 12/1994 | Byles | 138/177 X |
| 6,041,829 | * | 3/2000 | Chancellor | 138/177 |

* cited by examiner

*Primary Examiner*—Patrick Brinson
(74) *Attorney, Agent, or Firm*—Diller, Ramik & Wight

(57) ABSTRACT

A conduit, in particular for sanitary and/or heating installations, comprising a pipe for conveying a fluid or for accommodating supply lines such as electric power supply lines or fluid-conducting pipes, is characterized in that the pipe is connected to a mounting material strip for fastening the pipe to a surface, and object or the like, the mounting material strip projecting laterally from the pipe and extending along the pipe.

5 Claims, 1 Drawing Sheet

CONDUIT IN PARTICULAR FOR SANITARY AND HEATING INSTALLATION PURPOSES

BACKGROUND OF THE INVENTION

The present invention refers to a conduit having its particular application in the field of sanitary and heating installation and which is provided with a tube for conveying a fluid or for accommodating supply lines such as power supply lines or fluid-conducting pipes.

Plastic conduits find ever increasing use in the construction industry, one the one hand as waste water pipes and, on the other hand, as sanitary and heating pipes. Among others, plastic conduits are advantageous because of their light weight and the simple manner they can be placed, as well as their corrosion resistance. Further, plastic conduits have good noise insulating capabilities and are easy to mount.

There is a certain problem in placing plastic conduits on the surface, i.e. on the plaster. To this end, special tube clips are used to fasten the conduits to the substrate (plaster, but also wooden beams and the like).

SUMMARY OF THE INVENTION

It is the object of the present invention to provide a conduit for surface mounting that can easily be placed on the substrate.

According to the invention, the object is solved with a conduit, specifically for use in the field of sanitary and/or heating installation, provided with a pipe for conveying a fluid or for accommodating supply lines such as power supply lines or fluid-conducting pipes. This conduit is characterized in that the pipe is connected with a mounting material strip for fastening the pipe to a surface, an object or the like, the mounting material strip projecting laterally from the pipe (at least in one direction) and extending along the same. The fastening can easily be done by tacking or nailing, for example. Preferably, the mounting material strip extends beyond the pipe at both sides and is designed as film strip. Suitably, the mounting material strip extends tangentially to the pipe. Such a mounting material strip preferably comprises two different flange portions within which it can be fastened to the substrate.

The pipe of the present conduit is either a fluid-conducting pipe or an empty pipe for accommodating, and thereby mechanically protecting, a fluid-conducting pipe or other supply lines such as power supply lines. If the pipe of the present conduit serves as an empty pipe, it is advantageous to design the empty pipe as a corrugated pipe. Such corrugated pipes are flexible and can thus be bent easily and may be placed following bends.

The mounting material strip of the present conduit is suitably positively connected with the pipe, in particular by form fit, frictional engagement or material connection. Specifically, the mounting material strip is connected to or placed around the pipe by co-extrusion. In the latter case, the cross-sectional shape of the mounting material strip is shaped substantially like an Ω. In this embodiment of the invention, the mounting material strip thus comprises a central connecting strip within which the mounting material strip encloses the pipe completely and from which two flange portions of the mounting strip extend laterally beyond the pipe.

As an alternative to the above described embodiment of the invention, the central portion of the mounting material strip does not enclose the pipe completely but only partly. In this central portion, the strip is preferably glued to the pipe.

Suitably, when the conduit serves as a protective pipe, particularly when designed as a corrugated pipe, the pipe will be provided from the beginning with a fluid-conducting inner pipe. Thus, a pipe-in-pipe system is provided wherein the inner pipe may be of plastic material, metal, or a plastic and metal composite.

BRIEF DESCRIPTION OF THE DRAWINGS

The following is a detailed description of en embodiment of the present invention. In the Figures:

FIG. 2 is a cross-sectional view of the conduit of the present invention with an inner pipe and mounted on a substrate, e.g. a beam or the like.

Referring now to the Figures, FIG. 1 Illustrates a section of a conduit 10 that may be produced as a continuous conduit. This conduit 10 comprises a corrugated pipe 12 of plastic material serving as an empty pipe and thus as a protective pipe. The corrugated pipe 12 is enclosed by a substantially Ω-shaped mounting material strip 14 of plastic material. This material strip 14 comprises a central portion 16 completely endosing the corrugated pipe 12. On both sides of the hose-like central portion 16, flanges 18 project tangential to the corrugated pipe 12 and the (hose) central portion 16. These flange portions 18 serve to mount the conduit 10 on a substrate 20, as Illustrated in FIG. 2, for example. This substrate 20 may be a wooden beam or a layer of plaster. The conduit 10 is fastened with nails 22 or substantially U-shaped clamps or mounting clips driven through the flange portions 18 into the substrate 20 by tacking. As illustrated in FIG. 2, a fluid-conducting inner pipe 24 of plastic material is arranged in the corrugated pipe 12.

Figure 1:
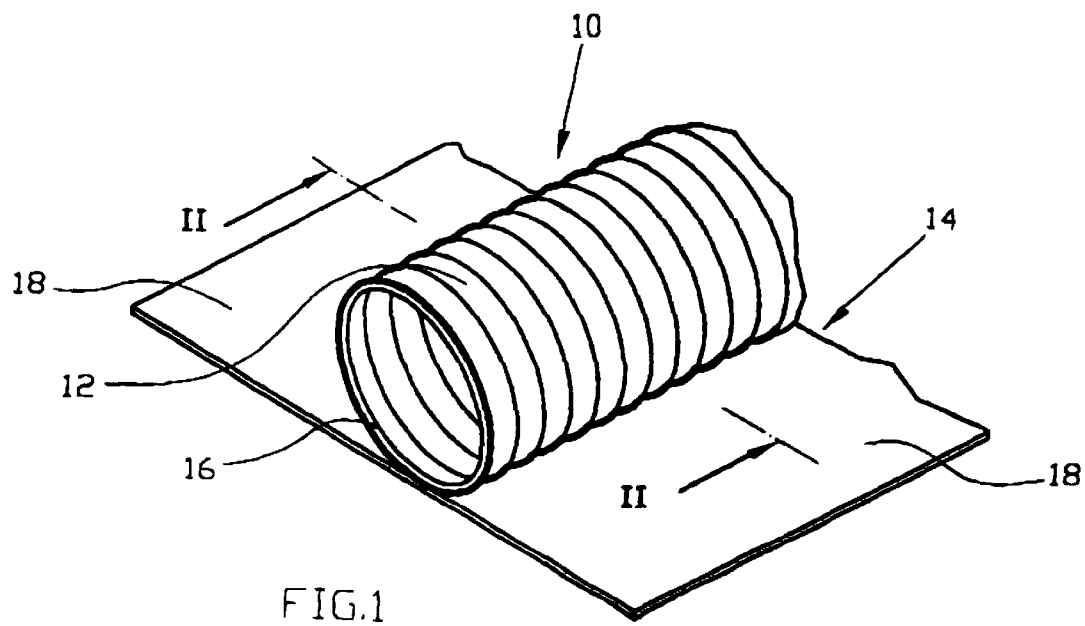
FIG. 1 is a perspective view of a section of a conduit according to the present invention.
Figure 2:
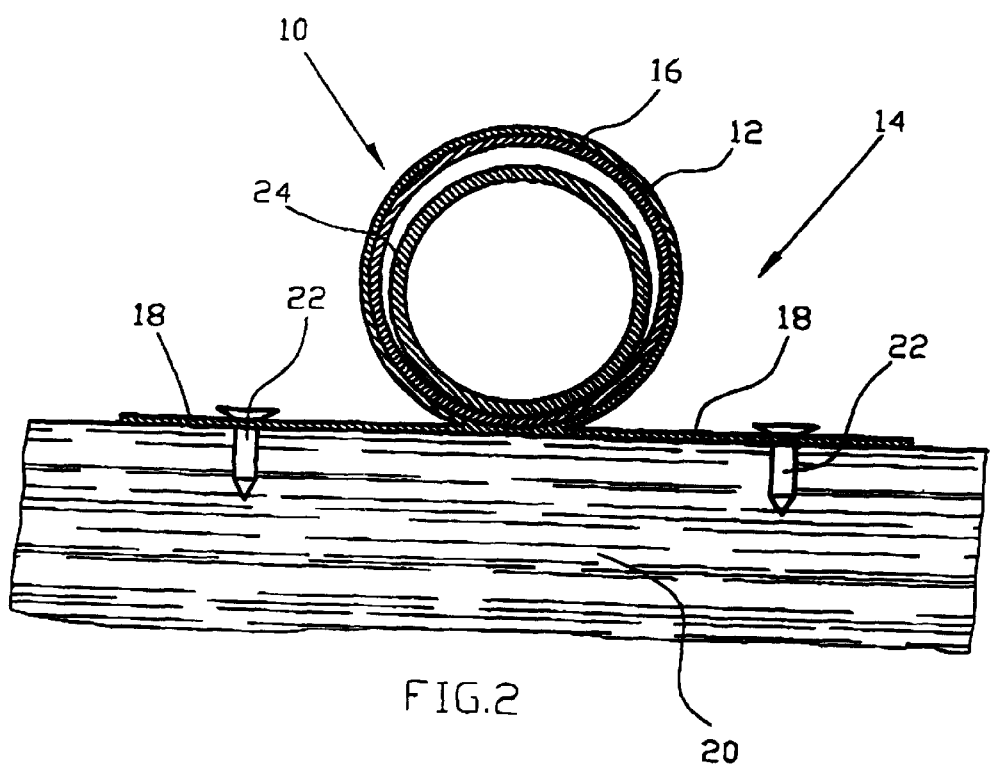

The mounting material strip 14 is provided on the corrugated pipe 12 preferably by co-extrusion and mechanically connected therewith. Thus, a conduit 10 that is simple to produce is obtained which enables an extremely simple mounting on a substrate without a need for pipe clips or bands or the like. As far as the connection of the inner pipe 22 is concerned, use may be made of proven fitting systems or the like. This is advantageous with respect to logistics.

What is claimed is:

1. A conduit, in particular for sanitary and/or heating installations, comprising a pipe for conveying a fluid or for accommodating supply lines such as electric power supply lines or fluid-conducting pipes, wherein the pipe is connected to a mounting material strip for fastening the pipe to a surface, the mounting material strip projecting laterally from the pipe and extending along the pipe, said mounting material strip including a central connecting portion connected with the pipe, at least one flange portion projecting from the central connecting portion, and the central connecting portion encloses the pipe at least partly.

2. The conduit of claim 1, wherein the mounting material strip encloses the pipe completely with its central connecting portion.

3. The conduit of claim 2, wherein the central connecting portion is a tube surrounding the pipe on the outside.

4. The conduit of claim 3, wherein the pipe is a supporting pipe, in particular a corrugated pipe.

5. The conduit of claim 4, wherein the mounting material strip is formed by extruding plastic material to or around the pipe.

* * * * *